(12) United States Patent
Lu

(10) Patent No.: US 6,581,318 B1
(45) Date of Patent: Jun. 24, 2003

(54) COMBINATION OF FISHING ROD AND REEL

(76) Inventor: Han-Chi Lu, No. 22 Jien Ren Street, Taichung City (TW)

(*) Notice: Subject to any disclaimer, the term of this patent is extended or adjusted under 35 U.S.C. 154(b) by 10 days.

(21) Appl. No.: 10/044,252

(22) Filed: Jan. 14, 2002

(51) Int. Cl.$^7$ ................................................ A01K 87/06
(52) U.S. Cl. .................................... 43/22; 43/20; 43/23
(58) Field of Search ........................... 43/18.1, 18.1 CT, 43/18.1 R, 20–23, 24; D22/137, 138; 242/323; 285/401, 22, 31, 399

(56) References Cited

U.S. PATENT DOCUMENTS

| | | | | |
|---|---|---|---|---|
| 2,746,695 A | * | 5/1956 | Clay | 242/229 |
| 2,752,717 A | * | 7/1956 | Lind | 43/20 |
| 2,783,952 A | * | 3/1957 | Clay | 242/233 |
| 2,834,559 A | * | 5/1958 | Nagy | 242/241 |
| 3,698,747 A | * | 10/1972 | Wing et al. | 285/305 |
| 4,027,419 A | * | 6/1977 | Popeil | 43/18.1 CT |
| 4,439,945 A | * | 4/1984 | Chang et al. | 43/22 |
| 4,679,959 A | * | 7/1987 | Cavallaro | 24/573.11 |
| 5,600,915 A | * | 2/1997 | Ohmura | 43/22 |
| 5,881,489 A | * | 3/1999 | Young | 43/20 |
| 6,178,685 B1 | * | 1/2001 | Broadway | 43/18.1 R |

* cited by examiner

*Primary Examiner*—Charles T. Jordan
*Assistant Examiner*—Tara M Golba
(74) *Attorney, Agent, or Firm*—Charles E. Baxley

(57) ABSTRACT

A fishing reel receiving device includes a sleeve which has one end connected to a fishing rod and a reel is engaged with the other end of the sleeve. A hole in an end of the sleeve for the fishing line extending therethrough. Two ribs extend from an inner periphery of the distal end of the sleeve and the reel has two engaging slots so as to receive the two ribs. A safety member is movably inserted in the reel so as to prevent the button of the reel from being unintentionally touched.

4 Claims, 7 Drawing Sheets

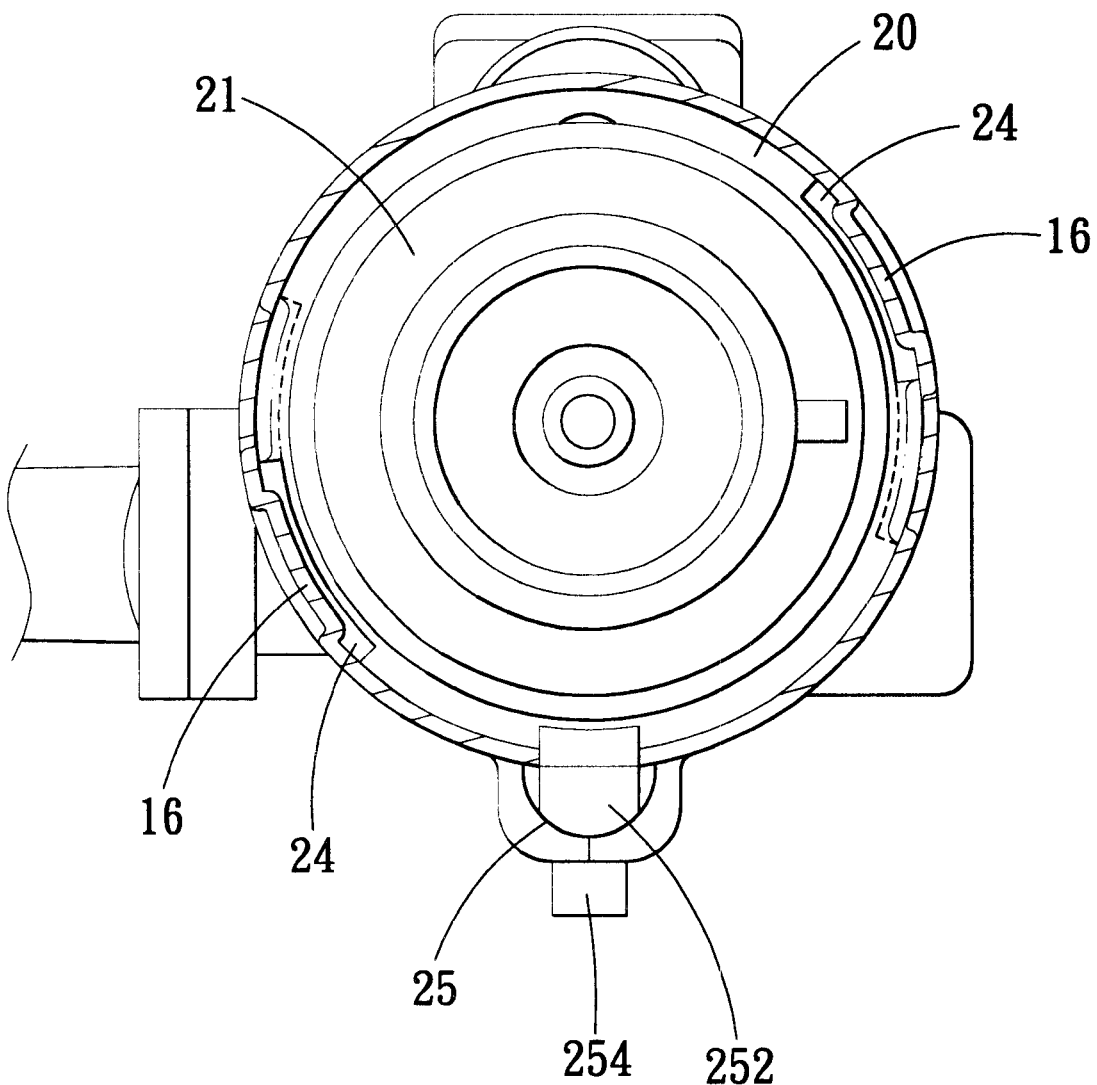
F I G. 3

COMBINATION OF FISHING ROD AND REEL

FIELD OF THE INVENTION

The present invention relates to a fishing rod having a hollow handle for receiving the reel and a safety member is connected to the reel to prevent the button on the reel from being unintentionally touched.

BACKGROUND OF THE INVENTION

A conventional combination of a fishing rod 140 and a reel 100 is shown in FIG. 7 and the reel 100 is fixedly mounted to the fishing 140 by a clamp and a bolt (not shown). The reel 100 protrudes from the fishing rod 140 so that it occupies a larger space which is inconvenient for the user to store. In order to store the fishing rod 140 and the reel 100 in a compact pack, the reel 100 has to be disengaged from the rod 140 and this requires a tool to unscrew the bolt. Besides, the reel 100 has a button 130 engaged with a slot 120 in the casing 111 of the reel 100 so as to stop the mandrel assembly 110 in the casing 111. The button 130 could be touched unintentionally during operating the fishing rod 140 and the reel 100 and therefore affects the fishing action.

SUMMARY OF THE INVENTION

In accordance with one aspect of the present invention, there is provided a fishing reel receiving device which comprises a sleeve having a first hole and a second hole in which an end of a fishing rod is engaged. An open end is defined in the other end of the sleeve and two ribs extend radially inward from an inner periphery of the open end. A reel has two engaging slots defined in an outer periphery of the reel so as to receive the two ribs when the reel is engaged with the open end. A fishing line wound on the mandrel of the reel extends from the first hole in the sleeve.

The primary object of the present invention is to provide a sleeve which is connected to a handle of a fishing rod and the reel is engaged with the sleeve so as to reduce the space that the fishing rod and the reel occupy.

Another object of the present invention is to provide a safety member that prevents the button on the reel from being pushed unintentionally.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3 is a top view to show the locking member engaged with the notch of the sleeve;

DETAILED DESCRIPTION OF THE PREFERRED EMBODIMENT

Figure 1:
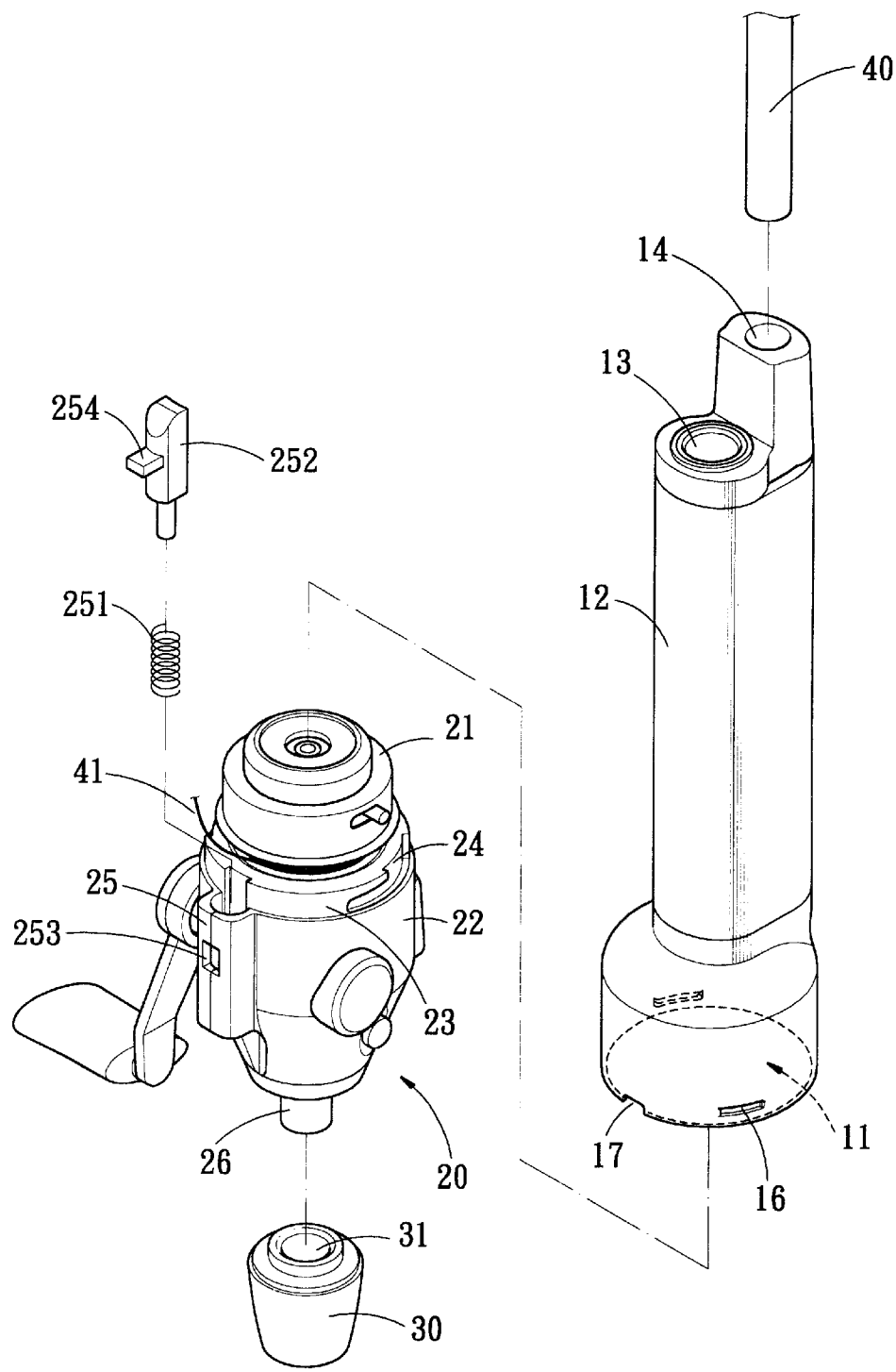
FIG. 1 is an exploded view to show a sleeve and a reel of the present invention.
Figure 2:
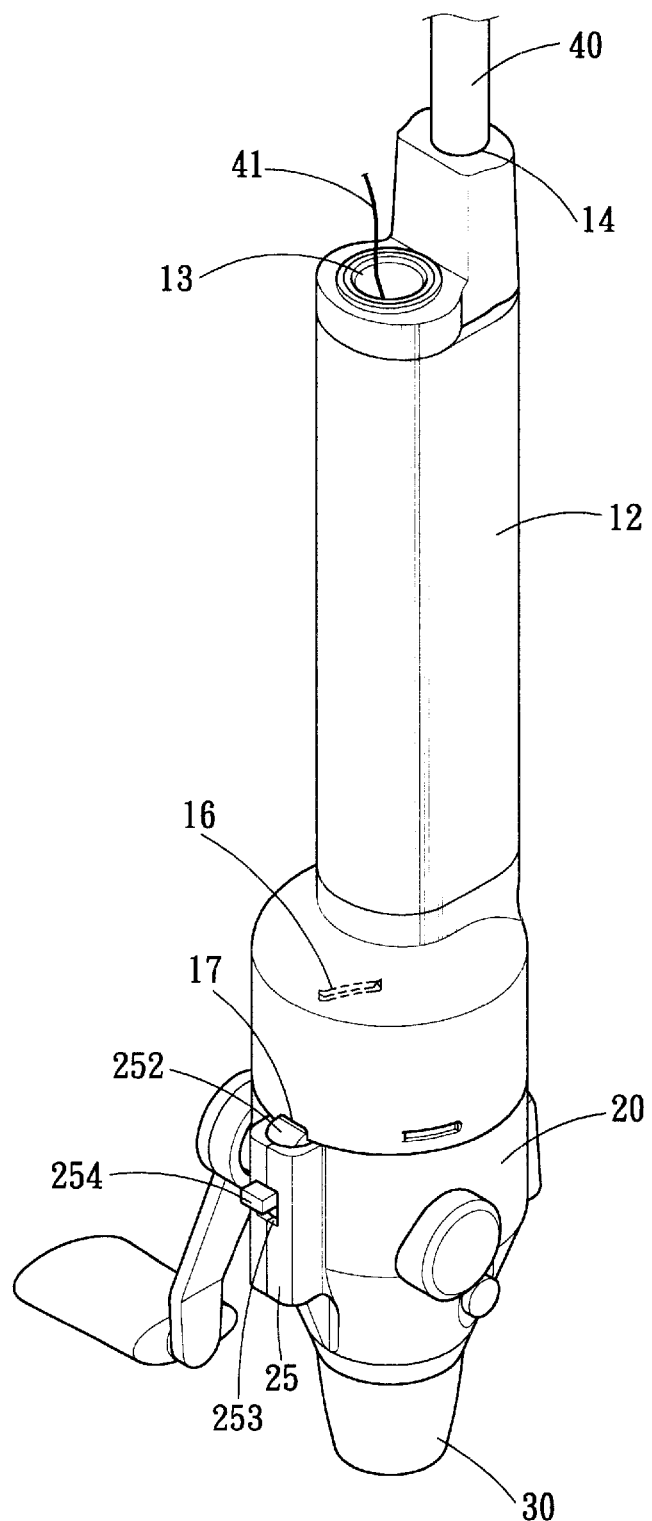
FIG. 2 is a perspective view to show the sleeve and the reel of the present invention.
Figure 4:
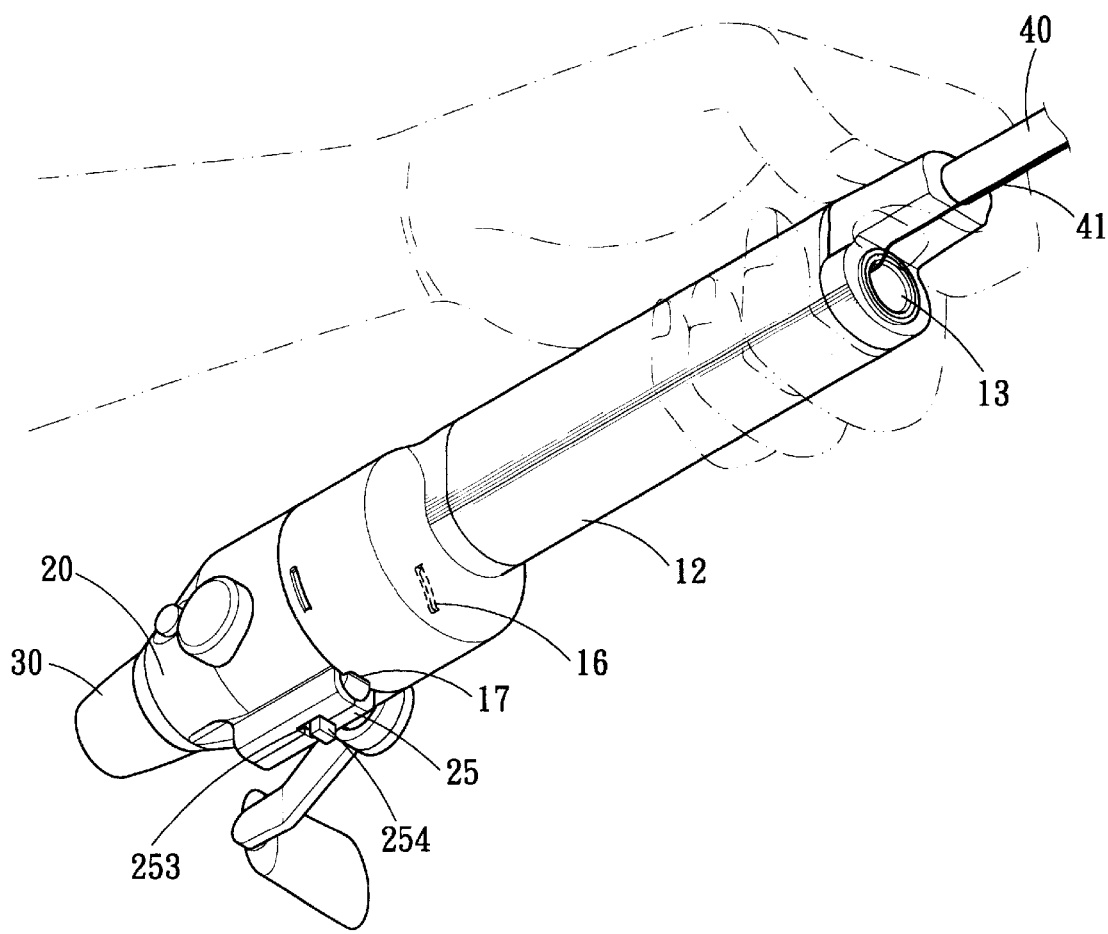
FIG. 4 is a perspective view to show a user's hand holding the sleeve of the present invention.

Referring to FIGS. 1, 2 and 4, the fishing reel receiving device of the present invention comprises a sleeve 12 which has a first hole 13 and a second hole 14 defined in a first end thereof. The second hole 14 receives an end of a fishing rod 40 therein and the first hole 13 allows the fishing line 41 to go out therefrom. An open end 11 is defined in a second end of the sleeve 12 and two ribs 16 extend radially inward from an inner periphery of the open end 11. A notch 17 is defined in an edge of the open end 11.

A reel 20 has a mandrel 21 connected to a first end thereof and the fishing line 41 is wound on the mandrel 21. Two engaging slots 24 are defined in an outer periphery 23 of the reel 20. The mandrel 21 is received in the open end II of the sleeve 12 and the fishing line 41 wound on the mandrel 21 extends from the first hole 13 in the sleeve 12. The two ribs 16 are engaged with the engaging slots 24 in the reel 20. A collar 22 is mounted to the reel 20 and a protrusion 25 extends from the collar 22 so as to define a recess between the protrusion 25 and the reel 20. An aperture 253 is defined through the protrusion 25 and communicates with the recess. A locking member 252 and a spring 251 are received in the recess. A lug 254 extends from the locking member 252 and extends through the aperture 253. Referring to FIG. 3, an end of the locking member 252 is engaged with the notch 17 in the open end 11 to prevent the reel 20 from rotation. When pushing the lug 254 downward, the locking member 252 compresses the spring 251 and the end of the locking member 252 is disengaged from the notch 17. A cushion member 30 has a top hole 31 to receive an extension 26 from the second end of the reel 20.

Figure 5:
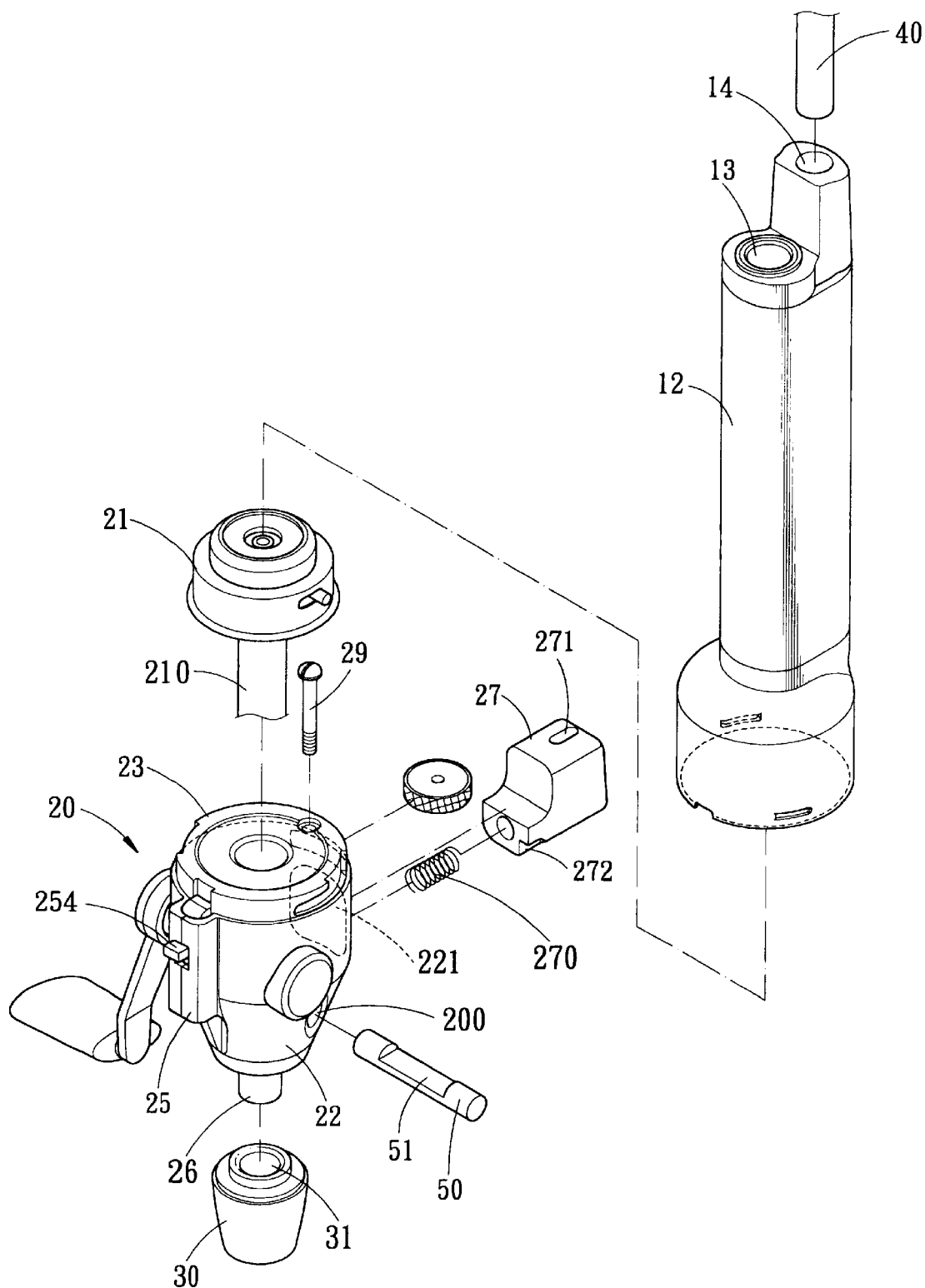
FIG. 5 is an exploded view to show the sleeve and a safety member and the reel of the present invention.
Figure 6:
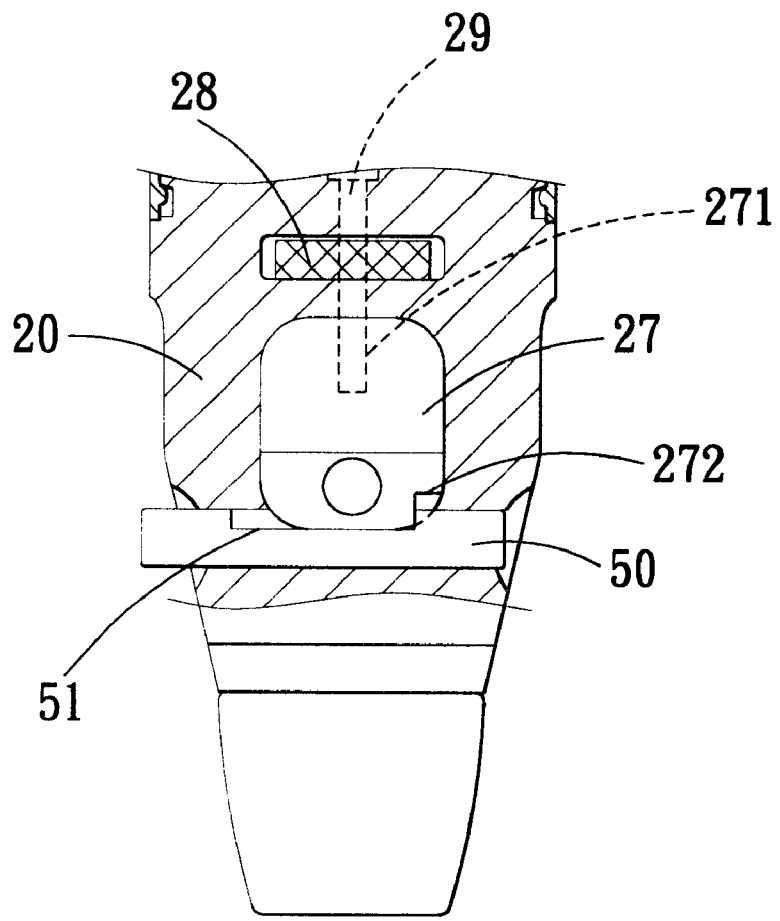
FIG. 6 is a cross sectional view to show the safety member and the button of the reel.
Figure 7:
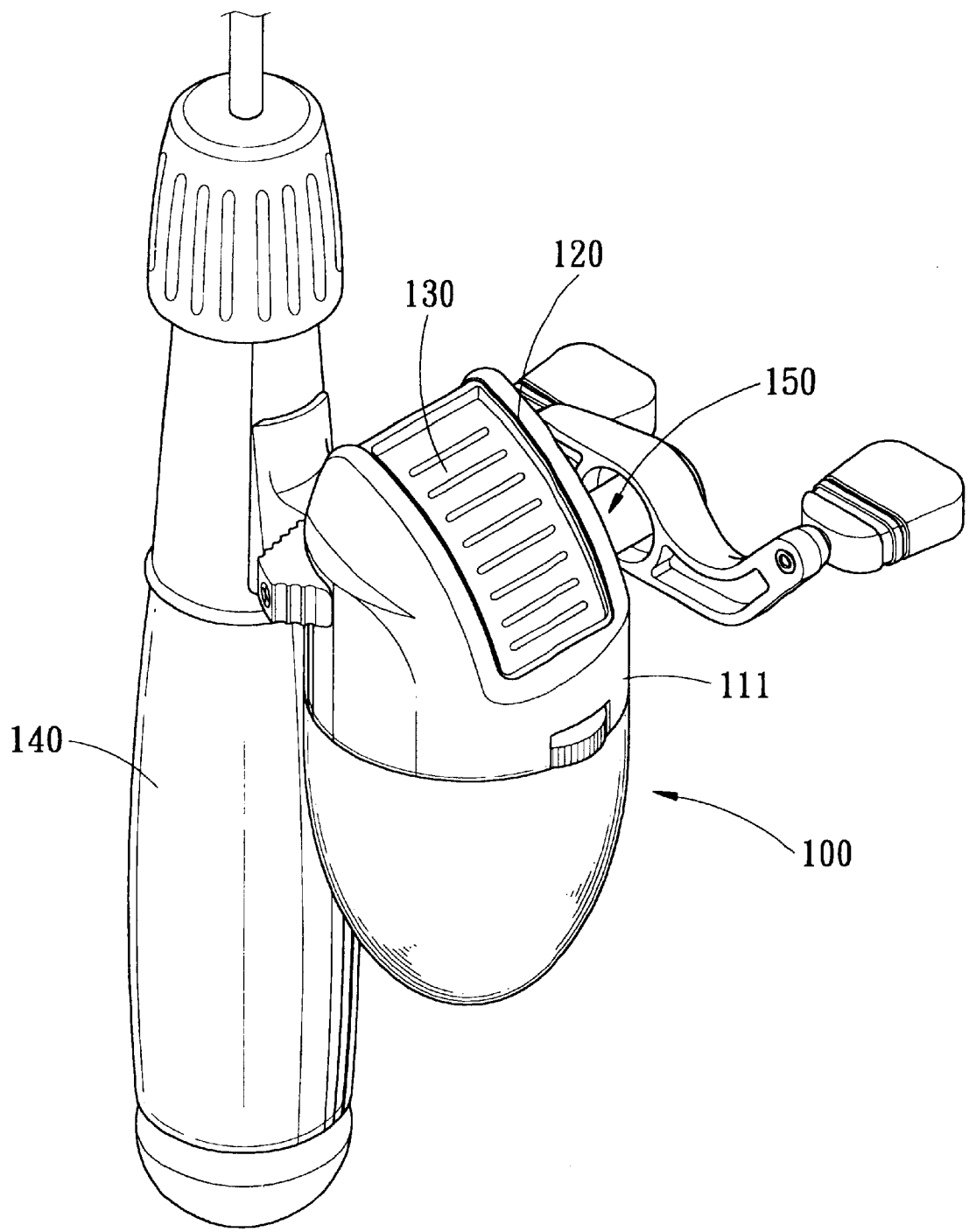
FIG. 7 is a perspective view to show conventional reel attached on a fishing rod.

As shown in FIGS. 5 and 6, a button 27 and a spring 270 are movably engaged with an opening 221 in the reel 20 and a distal end of the button 27 contacts a shaft 210 of the mandrel 21. A plain surface 272 is defined in a side of the distal end of the button 27. A safety member 50 is movably connected to the reel 20 and has a recessed area 51 defined in an outer periphery thereof. An elongate slot 271 is defined in the button 27 and a bolt 29 extends in the reel 20 and engaged with the elongate slot 271. When the safety member 50 is located in an open position. The plain surface 272 is engaged with a vertical wall of the recessed area 51 and the recessed area 51 allows the distal end of the button 27 to be moved toward the mandrel 21 to activate the mandrel 21. On the contrary, if the safety member 50 is pushed to let either end thereof interfere the movement of the button 27, the button 27 will not be pushed to activate the mandrel 21.

The reel 20 is not connected to a side of the fishing rod 40 so that it is easily to be stored. The reel 20 is also easily to be disengaged from the sleeve 12.

While we have shown and described the embodiment in accordance with the present invention, it should be clear to those skilled in the art that further embodiments may be made without departing from the scope of the present invention.

What is claimed is:

1. A fishing reel receiving device comprising:

a sleeve having a first hole and a second hole defined in a first end thereof, the first hole being adapted to allow a fishing line to pass therethrough and the second hole adapted to receive a fishing rod therein, an open end defined in a second end of said sleeve and two ribs extending radially inward from an inner periphery of said open end;

a reel having a mandrel connected to a first end thereof and two engaging slots defined in an outer periphery of the reel, said mandrel received in said open end of said sleeve and a fishing line wound on said mandrel extending from said first hole in said sleeve, the two ribs engaged with the two engaging slots;

a button movably connected to the reel and removably contacting a shaft of the mandrel, a passage defined through the reel and a first locking device defined in a side of the button, and a safety member being movably retained in the passage and a second locking device defined in an outer periphery of the safety member, the first locking device located in correspondence with the second locking device;

wherein said safety member is capable of engaging said button such that said button cannot contact said shaft of said mandrel.

2. The device as claimed in claim 1, wherein a notch is defined in an edge of the open end of the sleeve and a locking member biased by a spring is connected to an outside of the reel, the locking member disengagably engaged with the notch.

3. The device as claimed in claim 1 further comprising a cushion member connected to a second end of the reel.

4. The device as claimed in claim 1, wherein the first locking device of the button is a plain surface and the second locking device of the safety member is a protrusion portion which is located in correspondence with the plain surface.

* * * * *